(12) United States Patent
Sumcad et al.

(10) Patent No.: US 8,787,949 B2
(45) Date of Patent: Jul. 22, 2014

(54) METHOD FOR CONTROLLING A MOBILE COMMUNICATIONS DEVICE WHILE LOCATED IN A MOBILE VEHICLE

(75) Inventors: Anthony J. Sumcad, Southfield, MI (US); Shawn F. Granda, Novi, MI (US); Lawrence D. Cepuran, Northville, MI (US); Steven Swanson, Commerce Township, MI (US)

(73) Assignee: General Motors LLC, Detroit, MI (US)

( * ) Notice: Subject to any disclaimer, the term of this patent is extended or adjusted under 35 U.S.C. 154(b) by 644 days.

(21) Appl. No.: 12/984,446

(22) Filed: Jan. 4, 2011

(65) Prior Publication Data

US 2012/0172012 A1 Jul. 5, 2012

(51) Int. Cl.
*H04W 4/00* (2009.01)
*H04M 1/663* (2006.01)
*H04B 1/38* (2006.01)
*H04M 3/42* (2006.01)

(52) U.S. Cl.
USPC ...... 455/466; 455/412.2; 455/557; 455/414.1

(58) Field of Classification Search
USPC ............................ 455/466, 412.2, 557, 414.1
See application file for complete search history.

(56) References Cited

U.S. PATENT DOCUMENTS

| | | | |
|---|---|---|---|
| 7,050,834 B2 | 5/2006 | Harwood et al. | |
| 7,505,784 B2 | 3/2009 | Barbera | |
| 7,548,491 B2 | 6/2009 | Macfarlane | |
| 2003/0061049 A1* | 3/2003 | Erten | 704/260 |
| 2005/0143134 A1* | 6/2005 | Harwood et al. | 455/563 |
| 2008/0140408 A1* | 6/2008 | Basir | 704/260 |
| 2009/0163243 A1 | 6/2009 | Barbera | |
| 2009/0215466 A1 | 8/2009 | Ahl et al. | |
| 2009/0221279 A1* | 9/2009 | Rutledge | 455/418 |
| 2009/0275321 A1 | 11/2009 | Crowe | |
| 2010/0148920 A1 | 6/2010 | Philmon et al. | |
| 2010/0216509 A1* | 8/2010 | Riemer et al. | 455/557 |
| 2011/0063098 A1* | 3/2011 | Fischer et al. | 340/439 |
| 2011/0270679 A1* | 11/2011 | Tziortzis et al. | 705/14.58 |
| 2012/0214466 A1* | 8/2012 | Tadayon et al. | 455/418 |

* cited by examiner

*Primary Examiner* — Christopher M Brandt
*Assistant Examiner* — Muthuswamy Manoharan
(74) *Attorney, Agent, or Firm* — Dierker & Associates, P.C.

(57) ABSTRACT

A method for controlling a mobile communications device while located in a mobile vehicle involves pairing the mobile communications device with a telematics unit via short range wireless communication. The method further involves, receiving an incoming text message at the mobile device while the mobile device is paired with the telematics unit. Upon receiving the text message, a text messaging management strategy is implemented via the telematics unit and/or the mobile device, where the text messaging management strategy is executable via an application that is resident on the mobile device.

4 Claims, 1 Drawing Sheet

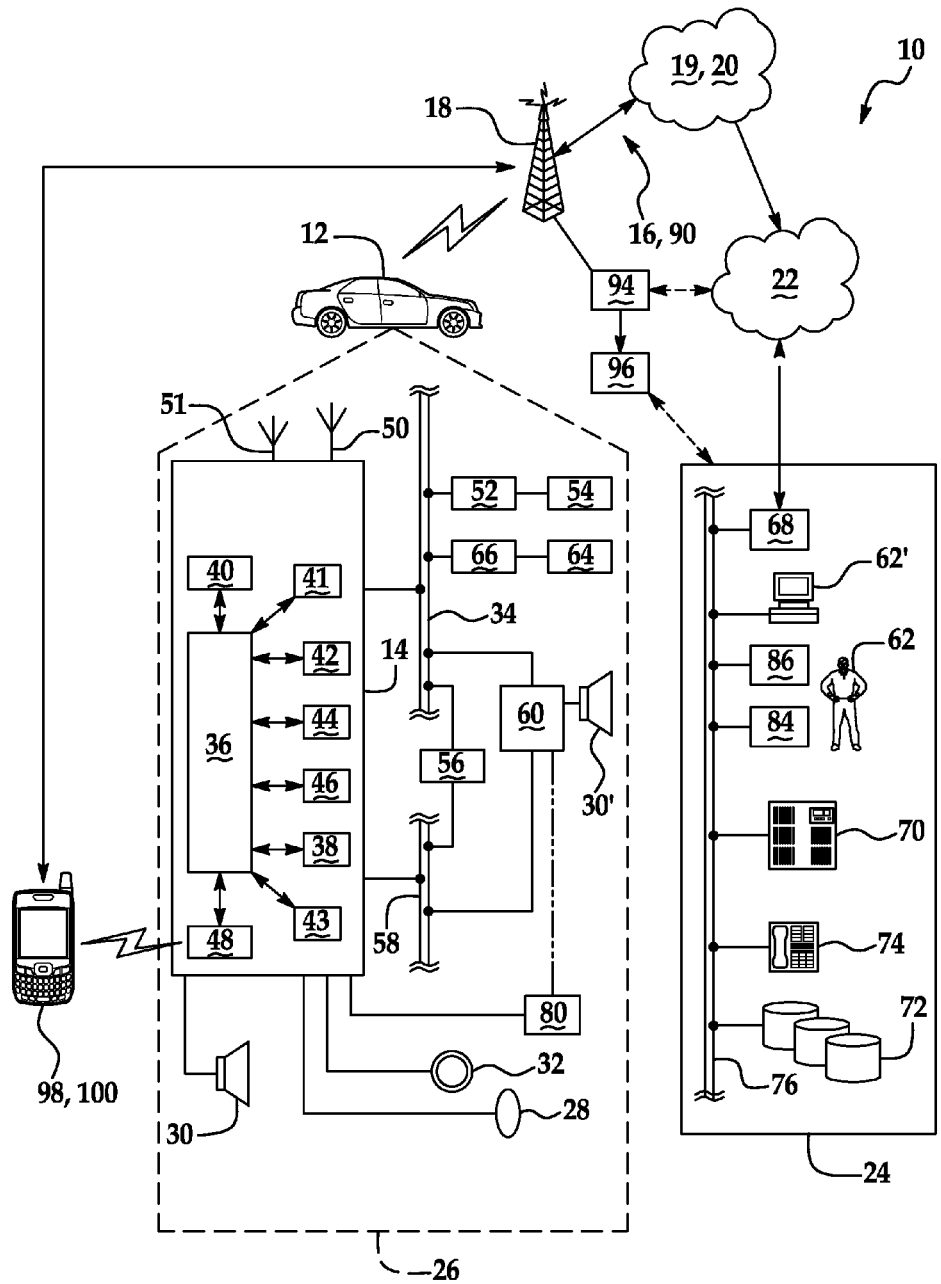

METHOD FOR CONTROLLING A MOBILE COMMUNICATIONS DEVICE WHILE LOCATED IN A MOBILE VEHICLE

TECHNICAL FIELD

The present disclosure relates generally to methods for controlling a mobile communications device while located in a mobile vehicle.

BACKGROUND

Cellular technology has enabled users of mobile communications devices to establish voice and/or data connections with other mobile devices and/or landline units. An example of a data connection includes sending and/or receiving text messages, and is often referred to as "text messaging" or simply "texting". Typically, texting requires at least some attention from the user and, in most cases, the use of at least one of the user's hands, to perform one or more tasks associated with the texting. When a user is texting while also being engaged in another activity, such as when operating machinery, while driving a vehicle, and/or the like, the user's attention may be diverted from the other activity.

SUMMARY

Methods for controlling a mobile communications device while located in a mobile vehicle are disclosed herein. One example of the method involves pairing the mobile communications device with a telematics unit disposed in the mobile vehicle. The pairing is accomplished using short range wireless communication between the mobile communications device and the telematics unit. The method further involves receiving an incoming text message at the mobile communications device while the mobile communications device is paired with the telematics unit. Upon receiving the incoming text message, a text messaging management strategy is implemented via any of the telematics unit or the mobile device, where the text messaging management strategy is executable via an application that is resident on the mobile communications device.

BRIEF DESCRIPTION OF THE DRAWING

Features and advantages of examples of the present disclosure will become apparent by reference to the following detailed description and drawing.

FIG. 1 is a schematic diagram depicting an example of a system for controlling a mobile communications device while located in a mobile vehicle.

DETAILED DESCRIPTION

Examples of the method disclosed herein may be used to implement a text messaging management strategy upon receiving a text message at a mobile communications device. The text messaging management strategy is used, at least in part, to keep a user's attention away from his/her mobile communications device while he/she is engaged in another activity that does not involve the mobile communications device. Examples of these other activities include driving a vehicle, operating other machinery, performing a physical activity that requires at least some level of human concentration, and/or any other activity that requires a user's attention. In a first example, the text messaging management strategy involves disabling at least one feature of a user's mobile device while the user is engaged in an activity other than one involving the mobile device. In a second example, the text messaging management strategy involves automatically making a copy of an incoming text message, and then transmitting the copied message to a facility. At the facility, the message is converted into a human audible form for potential playback to the user. In any event, the text messaging management strategy advantageously deals with incoming text messages so that the user can focus on the activity that he/she is then-currently engaged in. For instance, if a text messaging capability of the mobile device is disabled (such as in the first example stated above) or an incoming text is copied and transmitted (such as in the second example stated above), the user may focus all of his/her attention on the activity (such as driving a vehicle) rather than on reading and responding to an incoming text message.

The examples of the method disclosed herein are particularly useful for activities that occur while the user (and thus the mobile device) is located inside of a mobile vehicle. In one case, upon pairing the mobile device with the telematics unit of the vehicle (which may be accomplished as soon as the mobile device is inside the vehicle and/or within short range wireless communication range with the telematics unit), the disabling of the feature(s) of the mobile device (as well as re-enabling the feature(s) after the feature(s) has been disabled) may be accomplished on command by an in-vehicle telematics unit. In this case, the vehicle itself (via the telematics unit) communicates directly with the mobile device, and controls the disabling and re-enabling of the feature(s) on the mobile device so that the user can focus his/her attention, e.g., on driving rather than on using his/her mobile device. In another case, upon pairing the mobile device with the telematics unit, any incoming text messages are automatically copied and transmitted to a facility, which manages the text message(s) so that the user can focus his/her attention on the road.

As used herein, one example of a "text message" is a short, text-based message that may be transmitted over a cellular network between two or more mobile communications devices. A single text message may be limited to a predefined number of characters (e.g., 100 characters, 160 characters, etc.), which may, for example, be typed into the mobile device using a keypad, touch screen, or the like. Text messages are often referred to as short message service (SMS) messages, which are messages transmitted between two or more mobile devices using a short message service communication protocol. Other examples of text messages include images in conjunction with text (such as a multimedia service (MMS) message). It is to be understood that any other type of message not mentioned here is also considered to be a text message for purposes of this disclosure.

Also as used herein, a "feature" refers to an element or attribute of a mobile communications device that is configured to perform a particular function. Examples of features include, but are not limited to, text messaging capabilities, voice calling capabilities, game playing capabilities, audio/music playing capabilities, camera operation capabilities, internet access capabilities, electronic mailing (or e-mail) capabilities, and/or the like. In some cases, one or more these features may include sub-features. For example, the text messaging capabilities may include a notification function of an incoming text message, a text message receiving function, a text message creation function, and/or the like. As will be described in detail below in conjunction with one of the examples of the method disclosed herein, one or more of the feature(s)/sub-feature(s) may be disabled (and then re-enabled) by an application internal to (stored on) the mobile device in response to a command to do so from an in-vehicle telematics unit.

It is further to be understood that, as used herein, the term "user" includes any person in possession of a mobile communications device that is subject to being at least partially controlled when the text messaging management strategy is implemented. The "user" may therefore be a vehicle owner, a vehicle driver, and/or a vehicle passenger. In instances where the "user" is the vehicle owner, the term "user" may be used interchangeably with the term subscriber/service subscriber.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

FIG. 1 described in detail below depicts a system (identified by reference character 10) for controlling a mobile communications device while a user of the device is engaged in operating a mobile vehicle. For purposes of the instant disclosure, the mobile communications device may be selected from any mobile device capable of receiving and sending text messages (e.g., an SMS message) or messages including text and graphics (e.g., an MMS message). An example of such a mobile device includes a mobile cellular phone, smart phone, etc. As mentioned above, examples of the method are particularly useful for activities that occur involving a mobile vehicle (such as driving, for example), at least in part because at least some of the examples of the method have a vehicle dedicated communications device (i.e., a telematics unit) actively involved in the text messaging management strategy. For instance, in one example of the method, the telematics unit may be configured to control the disabling and the re-enabling functions of the mobile device. It is to be understood, however, that the examples of the method disclosed herein are not to be limited to activities that only involve a vehicle, and that a skilled artisan will know how to modify the teachings of the instant disclosure in order to apply the method while the user is engaged in another activity. For instance, the method may be applied when the user is engaged in operating construction equipment so long as the construction equipment has associated therewith a communications device that can pair with the mobile device.

The system 10 depicted in FIG. 1 may also be referred to as a mobile communications device control system. The system 10 generally includes a mobile vehicle 12, a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (not shown) including mobile network operator(s)), one or more land networks 22, and one or more telematics service/call centers 24. In an example, the carrier/communication system 16 is a two-way radio frequency communication system.

The wireless carrier/communication system 16 may be used to establish communication between a mobile communications device 98 and the telematics unit 14. For example, a user of the mobile communications device 98 (e.g., when outside the vehicle 12) may call the telematics unit 14 over the wireless carrier/communication system 16. However, when the mobile device 98 is located within close proximity (i.e., a distance suitable for short range wireless communication) of the telematics unit 14, communication between the mobile device 98 and the telematics unit 14 may be established via short range wireless connection (e.g., by pairing the telematics unit 14 and the mobile device 98 using a BLUETOOTH® unit or the like). In one example, the mobile device 98 is in close proximity of the telematics unit 24 when the mobile device 98 is inside the passenger compartment of the mobile vehicle 12. Further details of pairing the mobile device 98 with the telematics unit 14 will be provided below.

In an example, the carrier/communication system 16 also includes a host server 94 including suitable computer equipment (not shown) upon which information of a remotely accessible page 96 resides/is stored. For instance, the remotely accessible page 96 is a webpage set up and maintained by a network provider 90 or by a telematics service provider, and the user may access the page 96 by, e.g., submitting personal (e.g., a login ID) and authenticating information (e.g., a password, a PIN, etc.). The computer equipment used to log into the page 96 may also include hardware, which, for example, can receive and read a smart card for identification/authentication purposes, or can utilize biometrics for identification/authentication purposes.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 is a mobile vehicle, such as a motorcycle, car, truck, recreational vehicle (RV), boat, plane, etc., and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, speakers 30, 30' and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device that provides a variety of services, both individually and through its communication with the call center 24. The call center 24 is a facility that is owned and operated by a telematics service provider. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

As mentioned above, the short range wireless communication network 48 (e.g., the BLUETOOTH® unit) may be used to pair the mobile communications device 98 with the telematics unit 14. In an example, the telematics unit 14 continuously monitors for the presence of the mobile device 98 using a short range wireless antenna 51, and attempts to pair the device 98 with the telematics unit 14 upon recognizing the presence of the mobile device 98. In another example, the mobile device 98 continuously monitors for the presence of the telematics unit 14 using its own short range wireless antenna (not shown in FIG. 1). The mobile device 98 attempts to pair with the telematics unit 14 upon recognizing the presence of the telematics unit 14; which typically occurs as soon as the mobile device 98 is placed within the short range wireless range of the telematics unit 14. The mobile device 98 or the telematics unit alone may be configured to monitor for the presence of the other device, or the both of the devices 14, 98 may be configured to monitor for the presence of the other device at the same time.

The mobile device 98 and the telematics unit 14 are actually paired when the telematics unit 14 and the mobile device 98 exchange security codes/passwords with each other, which enables the telematics unit 14 and the mobile device 98 to communicate typically under a secured connection. As a more specific example, pairing may involve setting the mobile device 98 to a short range wireless discovery mode (such as by selecting, on the device 98, a discovery mode function as a menu option, icon, or the like). While in the discovery mode, other devices having a short range wireless communication system (such as the telematics unit 14) are allowed to detect the presence of the mobile device 98. When the telematics unit 14 locates the device 98, the device 98 automatically provides the type of device it is (e.g., a cellular phone) and its short range wireless connection name. This short range wireless connection name may, for instance, be selected by the user or provided by the manufacturer of the device 98. The device 98 may then prompt the user to enter a security code/password, and this security code/password is sent to the telematics unit 14. Upon receiving the security code/password, the telematics unit 14 sends its own security code/password to the device 98 to ultimately pair the two devices 14, 98 together.

Once the two units 14, 98 have been paired, the telematics unit 14 can directly communicate with the mobile device 98, and voice communications received at the mobile device 98 are transmitted to the user hands-free via the telematics unit 14. In one example of the method, the telematics unit 14 may be directly involved in controlling the mobile device 98, such as by submitting a command to the mobile device 98 to disable a feature/sub-feature of the device 98 upon detecting that the user is engaged in another activity (such as driving the vehicle 12). The command may be processed via a processor (not shown, but labeled 100) operatively disposed in the mobile device 98 to ultimately disable the feature/sub-feature. The processor 100 executes an application stored in a memory (not shown) of the mobile device 98 in response to the command, where the application is designed to disable the feature/sub-feature. It is to be understood that the application is further designed to re-enable the feature/sub-feature of the device 98 (if previously disabled) in response to a command from the telematics unit 14 upon detecting that the user is no longer engaged in the previously detected activity.

In another example of the method, the telematics unit 14 may be indirectly involved in controlling the mobile device 98. In this example, the processor 100 associated with the mobile device 98 recognizes that the mobile devise 98 is located inside the vehicle 12 when the device 98 is paired with the telematics unit 14. When the processor 100 recognizes that pairing has occurred, it activates an application that is resident on the device 98 so that any incoming text messages are automatically copied, and the copied message is routed, forwarded, or otherwise transmitted to a facility other than the mobile communications network provider or server. One example of a facility (other than the mobile communications network provider or server) is the call center 24. The text messages are routed to, and managed by the facility so long as the mobile device 98 is paired with the telematics unit 14.

It is to be understood that the telematics unit 14 may be implemented without one or more of the above listed components (e.g., the real time clock 46), except in these examples, the telematics unit 14 includes the short range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device 36 (also referred to herein as a processor) includes software programs having computer readable code to initiate and/or perform one or more steps of the examples of the method disclosed herein. For instance, the software programs may include computer readable code for recognizing an in-vehicle trigger to initiate a command to disable one or more features/sub-features of the mobile device 98, and another in-vehicle trigger to initiate a command to re-enable the previously disabled features/sub-features of the mobile device 98.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like. The electronic memory 38 may also be configured, in one example of the method, to temporarily store incoming text messages when a text message receiving function of the mobile device 98 is disabled. The stored text messages may be transmitted to the mobile device 98 by the telematics unit 14 (and thus deleted from the electronic memory 38) as soon as the receiving function of the mobile device 98 is re-enabled. In instances where the text message receiving function of the mobile device 98 is disabled, any incoming text messages may otherwise be temporarily stored at a short message center (SMSC) (which will be described in further detail below) until the receiving function of the mobile device 98 has been re-enabled. In the latter instance, the SMSC is notified that the receiving function of the mobile device 98 has been re-enabled upon receiving a notification message from the telematics unit 14 or from the mobile device 98 itself.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speakers 30, 30' provide verbal output to the vehicle occupants and can be either a stand-alone speaker (e.g., speaker 30) specifically dedicated for use with the telematics unit 14 or can be part of a vehicle audio component 60 (e.g., speaker 30'). In either event and as previously mentioned, microphone 28 and speaker(s) 30, 30' enable vehicle hardware 26 and telematics service data/call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider data/call center 24 (whether it be a live advisor 62 or an automated call response system 62') to request emergency services, for example.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker(s) 30, 30' via arbitration on vehicle bus 34 and/or audio bus 58.

As will be described in detail below, in one example of the method disclosed herein, the disabling of one or more features/sub-features of the mobile device 98 may, in some instances, involve restricting access to the feature(s)/sub-feature(s) instead of disabling the feature(s)/sub-feature(s) completely. In terms of text messaging, the restricted access may include various restrictions on messaging functions. For example, the user may be able to receive incoming messages, but cannot respond to them via normal texting practices (e.g., by typing a response into the keypad of the mobile device 98). In this example, the format of the incoming message may be altered so that the user can receive the message with minimal distractions while he/she is driving the vehicle 12. As such, the telematics unit 14 may be operatively associated with a text-to-speech engine 41 that converts the text of an incoming text message into an audible format. Converting may be accomplished by the text-to-speech engine 41, which utilizes one or more data translation algorithms to translate or otherwise convert the digital signals of the text (which is in the form of phonetic data) into an audible, human-understandable form. The audio form of the message may then be played back to the user through the audio component 60. In another example, the restricted messaging may enable the user to create a new message or respond to an incoming message by means other than by typing the message into the keypad of the mobile device 98. For instance, the user may audibly recite a new message or a reply to an incoming message into the microphone 28. Via a speech-to-text engine 43 (that is also operatively associated with the telematics unit 14), the contents of the audible reply is converted into text data. More specifically, the speech-to-text engine 43 utilizes speech recognition software to generate text data corresponding to the voice reply. For instance, the engine 43 digitizes and breaks the voice reply into phonemes, which are matched with representative phonemes in a dictionary that corresponds to one or more words. The words, in the form of phonetic data that is human understandable, are incorporated into a text message format and may be transmitted from the telematics unit 14 to the mobile device 98. The mobile device 98 may then forward or otherwise transmit the reply message to the sending device of the original SMS message.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the data center 24 (when transmitted thereto from the telematics unit 14) to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

A portion of the carrier/communication system 16 may be a cellular telephone system or any other suitable wireless system that transmits signals between the mobile device 98 and/or vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. The wireless portion of the carrier/communication system 16 further includes other supporting systems, including SMSCs, which are systems specifically designed to send, deliver, and/or transmit SMS or text messages to a desired destination (such as to the mobile device 98). The SMSCs also manage the queuing of messages. It is to be understood that SMSCs are not part of the actual radio link/channels, but are part of the core network systems of the cellular service provider 90. The sending, delivering, and/or transmitting of the SMS messages to the cellular service/network provider 90 may be accomplished using short message peer-to-peer (SMPP) protocol (i.e., a protocol for exchanging SMS messages between SMS peer entities, which use SMSCs for delivery of the SMS messages to a particular mobile unit).

It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The call centers 24 of the telematics service provider are designed to provide the vehicle hardware 26 and/or the vehicle user with a number of different system back-end functions. According to the example shown in FIG. 1, one call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call centers 24 functions. The various operations of the call center 24 are carried out by one or more computers (e.g., computer equipment 74) programmed to carry out some of the tasks of the call center 24. The computer equipment 74 (including computers) may include a network of servers (including server 70) coupled to both locally stored and remote databases (e.g., database 72) of any information processed. In an example, the processor 84 is operatively coupled to a computer readable medium encoded with software programs for performing one or more steps of the examples of the method described herein. For instance, the computer readable medium may be encoded with a software program for converting a text message, which was forwarded from the mobile device 98 to the call center 24, into a human audible format for audio playback to an intended recipient of the incoming text message (e.g., the user of the mobile device 98). In an example, the human audible format is generated in the form of a voice message, which may be transmitted back to the mobile device 98 via the communications module 86 described hereinbelow.

In an example, the communications module 86 includes suitable communications equipment that enables the call center 24 to establish a communication with, for example, the mobile device 98. Such equipment may, for instance, be capable of handling voice calls, packet data sessions, or other messaging-based communications between the call center 24 and the mobile device 98 (e.g., via a circuit-switch network), messaging (e.g., via VehComm), modems, TCP/IP supporting equipment, and/or the like. In an example, the communications module 86 may be configured to initiate a voice call to the mobile device 98, where the voice call includes an inquiry as to whether or not the user wants to listen to the voice message generated by converting the text message via the software program executed by the processor 84. In instances where the user indicates that he/she wants to listen to the voice message, the communications module 86 is further configured to transmit the voice message to the mobile device 98 during the voice call. However, in instances where the user indicates that he/she does not want to listen to the voice message, the communications module 86 is configured to end the voice call.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the call center 24 may be any central or remote facility, manned or unmanned, mobile or fixed, to or from which it is desirable to exchange voice and data communications. As such, the live advisor 62 may be physically present at the call center 24 or may be located remote from the call center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider call center 24, the telematics service provider is a separate and distinct entity from the network provider 90. In an example, the equipment, employees, etc. of the communications network provider 90 are located remote from the call center 24. The communications network provider 90 provides the user with telephone and/or Internet services, while the telematics service provider provides a variety of telematics-related services (such as, for example, those discussed hereinabove). It is to be understood that the communications network provider 90 may interact with the call center 24 to provide services (such as emergency services) to the user.

While not shown in FIG. 1, it is to be understood that in some instances, the telematics service provider operates a data center, which receives voice or data calls, analyzes the request associated with the voice or data call, and transfers the call to an application specific call center associated with the telematics service provider. It is to be understood that the application specific call center may include all of the components of the call center 24, but is a dedicated facility for addressing specific requests, needs, etc. Examples of application specific call centers include, but are not limited to, emergency services call centers, navigation route call centers, in-vehicle function call centers, or the like.

Examples of the method for controlling a mobile communications device (such as the mobile device 98) will now be described. It is to be understood that, in these examples, the controlling of the mobile device 98 is accomplished while the mobile device 98 is located inside a mobile vehicle (such as the vehicle 12). As mentioned above, the examples utilize an application that is resident on the mobile device 98 that is configured to implement a text messaging management strategy upon receiving an incoming text message. This text messaging management strategy manages incoming text messages so that the intended recipient of the text message (i.e., user of the mobile device 98) may continue to focus his/her attention on the activity that he/she is currently performing (e.g., driving the vehicle 12) instead of on his/her mobile device 98.

One example of the method of controlling the mobile device 98 involves disabling (and re-enabling) one or more features/sub-features of the device 98 while the device is located inside the vehicle. This example utilizes an application stored in the mobile device 98 that, in response to a command from the in-vehicle telematics unit 14, is configured to disable (and re-enable) one or more features/sub-features of the mobile device 98. In one instance, the same application is used to disable and re-enable, and in another instance, different applications are used for disabling and re-enabling. It is to be understood that the initiating of the disabling and re-enabling is also directly linked to triggers detectable by the in-vehicle telematics unit 14, where the triggers are generally associated with an operational state of the vehicle 12. Details of this example will now be described hereinbelow.

Before the mobile device 98 may be controlled via the method involving disabling (and re-enabling) the features/sub-features of the device 98, the mobile device 98 is first associated with the telematics unit 14. This may be accomplished by registering both the telematics unit 14 and the mobile communications device 98 with the call center 24. In an example, registering may be accomplished by accessing (via, e.g., a computer station having Internet access capabilities) the remotely accessible page (or webpage) 96 and submitting, into a login screen on the webpage 96, an acceptable login and password (or identifying and authenticating information). Once the webpage 96 has been accessed, the person accessing the webpage 96 (which is typically an authorized user of the vehicle 12) may select (e.g., by selecting a menu option or an icon displayed on the webpage 96 screen) a program configured to associate the mobile communications device 98 with the telematics unit 14. In some cases, associating the mobile device 98 with the telematics unit 14 is the same as enrolling the mobile device 98 in a program for selectively controlling the mobile device 98 via the telematics unit 14. In an example, the user may access a user profile through the webpage 96, which typically includes information pertaining to the user and the user's vehicle 12. In many cases, the user profile will also include identification information of the in-vehicle telematics unit 14 (e.g., its serial number and the mobile dialing number (MDN)). In these cases, the user submits identification information of the mobile device 98 (e.g., its serial number, phone number, etc.), and indicates (e.g., via a mouse click on an appropriate icon or menu option on the webpage 96) to associate the two devices 14, 98. In cases where the telematics unit 14 is not identified in the user's profile, the user may submit both identification information of the telematics unit 14 and identification information of the mobile device 98, and indicate on the webpage 96 that the telematics unit 14 and the mobile device 98 are linked or associated with each other. The fact that the mobile device 98 is linked to or associated with the telematics unit 14 may then be stored in a user profile in one of the databases 72 at the call center 24.

Registering may otherwise be accomplished by placing a call (using, e.g., the telematics unit 14, the mobile device 98, or other communications device) to the call center 24, and submitting a request to the advisor 62, 62' to associate the telematics unit 14 with the mobile device 98, or visa versa. More specifically, the call is received at the switch 68, which directs the call to an appropriate advisor 62, 62' (or to an appropriate call center if the call is received at a data center). Upon authorizing the caller (e.g., who accurately responds to a number of challenge questions), the caller may submit the identification information of the mobile device 98 to the advisor 62, 62', who/which may use the information to associate the mobile device 98 with the telematics unit 14 and store it in the user profile in the database 72. In an example, the advisor 62, 62' may access the webpage 96 and link the two devices 14, 98 together (e.g., as if the user had accessed the webpage 96 himself/herself).

It is to be understood that the user (or caller) may want to associate or link a number of mobile devices 98 with a single telematics unit 14. For instance, the telematics unit 14 may be located in a vehicle 12 that is shared by two or more people (such as a family vehicle, where the father, mother, and son are each able to operate the vehicle 12), and each person owns or has in his/her possession an individual mobile communications device 98. Accordingly, each of the mobile devices 98 may be associated with the same telematics unit 14 using any of the example methods described herein. Similarly, it is to be understood that the user (or caller) may want to associate or link one mobile device 98 with multiple telematics units 14. For instance, a family may own multiple vehicles 12, each of which has its own telematics unit 14 and wish to associate one family member's mobile device 98 with each of the telematics units 14. Accordingly, the single mobile device 98 may be associated with each telematics unit 14 using any of the example methods described above.

During the registering of the mobile device 98 (via the webpage 96 or during the phone call with the call center 24), one or more preset conditions of the mobile device 98 may be set by the user/caller. These preset conditions are selected by the user/caller and generally identify i) the features/sub-features of a particular mobile device 98 that should be disabled, and ii) the events that, upon the occurrence thereof, will trigger the disabling of the features/sub-features. These events are referred to herein as first in-vehicle triggers. The preset conditions also identify the events that, upon the occurrence thereof, will trigger the re-enabling of the previously disabled features/sub-features. These events are referred to herein as second in-vehicle triggers. As will be described in further detail below, upon detecting an appropriate trigger, the feature/sub-feature of the mobile device 98 associated with the trigger (as set by the user in the preset conditions) may be disabled or re-enabled.

It is to be understood that the preset conditions set by the user may be the same for each of the registered mobile devices 98 (in instances where more than one mobile device 98 is associated with the telematics unit 14). For instance, the preset conditions may include the disabling of text message sending functions and text message receiving functions of all of the mobile devices 98 associated with the telematics unit 14 upon changing the vehicle 12 to an ignition-on state. It is further to be understood that different preset conditions may otherwise be set for each respective mobile device 98. For instance, mobile devices 98 possessed by Mom and Dad in a family that includes members who are authorized to drive the vehicle 12 may be completely unrestricted (i.e., none of the features/sub-features of the mobile devices 98 are disabled in response to a trigger), whereas the mobile device 98 for Charlie (Mom and Dad's son) may include a restriction on all text messaging capabilities in response to an ignition-on state of the vehicle (i.e., a first in-vehicle trigger), and a removal of the restriction (i.e., the re-enabling of all of the text messaging capabilities) in response to an ignition-off state of the vehicle (i.e., a second in-vehicle trigger).

The preset conditions are generally set until the authorized user accesses the webpage 96 (or calls the call center 24), and removes or otherwise changes the preset conditions associated with one or more of the mobile devices 98. The removed/changed preset conditions will take effect as soon as they are stored in the user profile, and remain as active preset conditions until the user's subscription with the call center 24 expires or is canceled, or for a duration predefined by the user. It is further to be understood that authorized persons alone are allowed to remove/change the preset conditions stored in the user profile (e.g., Mom and Dad may be authorized to remove/change the preset conditions for all of the mobile devices 98 registered with the vehicle 12, whereas Charlie (their son) may not be authorized). Those that are authorized to remove/change the preset conditions are pre-established by the user who originally set up the subscription account, or by others who the user has indicated as being authorized to change the preset conditions. Those that are authorized to remove/change the preset conditions may be identified, by the user, when the preset conditions are originally set up and/or may be added at any subsequent time.

Once the preset conditions are set (or each time the preset conditions are changed), the preset conditions may be applied to an application that is unique to a respective mobile device 98, and this application may be downloaded onto the mobile device 98 from a server 70 of the call center 24 (e.g., via a webpage 96 of the telematics service provider) or via an application store associated with the mobile device 98.

In another example, the application may be downloaded onto the mobile device 98, and then the preset conditions may be set by the user via the mobile device 98 itself. In this example, the application may include a program that allows the user to designate preferences and to set particular conditions pertaining to the operation of the device 98. The user may access a control panel or options screen associated with the application resident on the mobile device 98, and then select or identify the preset conditions from a menu of options, for instance. In an example, the preset conditions may be set until the conditions are changed by the user (e.g., by accessing the program associated with the application on the device 98), or until the device 98 is turned to a power-off state. In the latter case, the user would have to reset the preset conditions upon powering the device 98 back on.

The application, when executed by the processor 100 of the mobile device 98, includes machine readable instructions (e.g., software routines/program codes) that apply the disabling and re-enabling functions of the mobile device 98 in accordance with the preset conditions. In an example, the telematics unit 14 transmits a signal to the mobile device 98 upon detecting an in-vehicle trigger (such as, e.g., a shift of a transmission system of the vehicle 12 into a drive mode), which is received and processed by the processor 100 of the device 98. In response to the signal, the processor 100 activates the application resident on the device 98, which initiates a program code associated with the application that is responsible for disabling a particular feature of the device 98 (such as a text message creation function and text message receiving function).

Further, once the preset conditions are set (or each time the preset conditions are changed) upon registering the device 98, the preset conditions are also directly downloaded to and stored in the memory 38 of the telematics unit 14 from the webpage 96 or call center 24. In instances where the preset conditions are set by accessing the application resident on the device 98, the preset conditions may be sent to the telematics unit 14 using the short range wireless connection established upon pairing the device 98 with the telematics unit 14. The telematics unit 14 stores the preset conditions in the memory 38 upon receiving them from the mobile device 98. The preset conditions (which include the identity of the mobile devices 98, the restrictions (if any) applied to each of the mobile devices 98 associated with the telematics unit 14, and the triggers associated with the application of the restrictions) are utilized by the telematics unit 14 to i) identify the mobile device 98, and ii) detect or identify a trigger to disable (or re-enable) the identified feature/sub-feature of the mobile device 98.

After the preset conditions are stored in the telematics unit 14, and the respective application(s) is/are stored on the mobile device(s) 98, an example of the method for controlling one or more of the devices 98 involves disabling a feature/sub-feature in response to the first trigger. Via the preset conditions stored in the telematics unit 14, in an example, the telematics unit 14 is aware of the mobile device(s) 98 that it is associated with, and thus continuously monitors (via, e.g., the antenna 51) for the presence of one or more of the associated mobile devices 98 inside the vehicle 12. Upon detecting the presence of one of the mobile devices 98 (which, for example, may occur when the mobile device 98 is carried into the vehicle 12 with the person in possession of the device 98 and both devices 98 and 14 are in an ON state), the telematics unit 14 pairs with the mobile device 98 via the short range wireless network 48 (such as, e.g., a BLUETOOTH® connection).

Once the telematics unit 14 is paired with the mobile device 98, the telematics unit 14 scans the preset conditions to determine whether or not the paired mobile device 98 has any restrictions associated with one or more features/sub-features of the device 98. If, for example, the telematics unit 14 pairs with Mom's mobile device, upon scanning the preset conditions, the telematics unit 14 may recognize that Mom's device has no restrictions associated therewith. In this example, the telematics unit 14 may remain connected so that the user can use the mobile device 38 through the hands free telematics unit 14. However, if the telematics unit 14 pairs with Charlie's (the son's) mobile device 98, upon scanning the preset conditions, the telematics unit 14 may recognize that there are some restrictions associated with one or more features/sub-features of Charlie's device. As will be described further below, upon recognizing the trigger defined in the preset conditions, the telematics unit 14 initiates the disabling of the restricted features/sub-features of Charlie's device.

The preset conditions may set forth any event to trigger the predefined restriction(s) of the mobile device 98. In an example, the event (or trigger) may be associated with an operational state of the mobile vehicle 12, such as an ignition-on state of the mobile vehicle 12 (e.g., when Charlie places the key into the ignition and powers on at least the electronics of the vehicle 12) or a shift of a transmission system of the vehicle 12 into a drive mode. When the ignition-on state is the trigger, as soon as the electronics or the engine of the vehicle 12 are/is started, the telematics unit 14 automatically transmits a signal to the mobile device 98 to disable the restricted features/sub-features. In other instances, the event (or trigger) is the pairing of the telematics unit 14 with the mobile device 98. In these instances, the disabling function may be initiated as soon as the mobile device 98 is paired with the telematics unit 14, and in response to the pairing, the telematics unit 14 automatically transmits a signal to the mobile device 98 to disable the restricted features/sub-features regardless of the operational state of the engine of the vehicle 12.

As mentioned above, as soon as the trigger is recognized, the telematics unit 14 transmits a signal to the processor 100 of the mobile device 98 commanding the processor 100 to initiate the application to disable the features/sub-features identified in the preset conditions. In an example, the signal is transmitted directly from the telematics unit 14 to the mobile device 98 through the short range wireless communication link established via network 48. In another example, the signal is transmitted indirectly from the telematics unit 14 to the mobile device 98. In this example, upon recognizing the trigger, the telematics unit 14 automatically notifies the call center 24 that the trigger occurred. The call center 24 looks up the preset conditions stored in the user profile in the database 72 and, via the wireless carrier 16, transmits a signal to the mobile device 98 to disable the features/sub-features identified in the preset conditions. In any event, the signal transmitted to the mobile device 98 (either directly from the telematics unit 14 or from the call center 24) includes a command to initiate disabling of the features/sub-features identified in the preset conditions already incorporated into the application on the device 98. It is to be understood that if the application does not already include the preset conditions, the signal transmitted to the device may include, in addition to the command, the actual restrictions that should be applied to the mobile device 98.

Upon receiving the signal from the telematics unit 14 (or from the call center 24), the application executed by the processor 100 disables the features/sub-features of the mobile device 98 identified in the preset conditions using suitable software programs and/or routines. If, for example, a message notification function of Charlie's mobile device is restricted, Charlie will not be notified (via, e.g., a ring tone or a vibration of the device 98) of an incoming text message. Thus, the disabling of the message notification function includes the disabling of a ring mode or a vibration mode of Charlie's device whenever a new text message is received. In the foregoing example, the message notification function of Charlie's device is restricted so long as the device 98 is in a disabled operational mode. As such, incoming messages will be received by the mobile device 98, however Charlie will not know that the messages have been received until he checks the device 98 for new messages.

It is to be understood that the disabling of the features/sub-features of the mobile device 98 may otherwise be accomplished by incorporating additional functions/features to the operational mode of the mobile device 98, as opposed to restricting already existing functions/features. In this example, the preset conditions may include forwarding incoming messages to the text-to-speech engine 41 and/or enabling message response and/or creation via the speech-to-text engine 43. For instance, when the mobile device 98 is paired with the telematics unit 14, the mobile device 98 links to the various in-vehicle components in communication with the telematics unit 14 via the bus 34. Upon receiving an incoming text message, the user may be notified of the same, for example, through the in-vehicle audio component 60. More specifically, when an incoming text message is received by the mobile device 98, the message (in its text form) is transmitted from the device 98 to the telematics unit 14 and may ultimately be recited to the user in a hands-free mode. Utilizing the text-to-speech engine 41 run by the processor 36 of the telematics unit 14, the text content of the message is converted into an audible format. In response to a prompt, the user may elect to listen to the audible form of the message, which is recited to the user through the speaker(s) 30, 30'. In response to another prompt, the user may elect to respond to the message. If the user elects to respond, the user may recite an audible reply into the microphone 28, which is converted into text via the speech-to-text engine 43 run by the processor 36 of the telematics unit 14. The text form of the reply is then transmitted from the telematics unit 14 to the mobile device 98, which is forwarded from the mobile device 98 to the device that sent the original text message.

In still other examples, the features/sub-features of the mobile device 98 may be completely deactivated while in the disabled operating mode. In these instances, both incoming and outgoing messages are prohibited, and thus no messages are actually transmitted to or from the device 98. When this type of disabling is selected, a default message or pre-selected message may be transmitted in response to any messages that are attempting to be sent to the mobile device 98. For example, if all of Charlie's text messaging features are completely deactivated (i.e., he cannot send or even receive messages), when another device attempts to transmit a text message to Charlie's mobile device 98, Charlie's device will block the message and reply with a text message saying "the customer you are trying to reach is not accepting messages at this time" or "Charlie's device is currently unavailable" or the like.

It is to be understood that the mobile device 98 may be disabled until the telematics unit 14 recognizes another in-vehicle trigger (i.e., the second trigger mentioned above) to initiate re-enabling of the device 98. More specifically, upon recognizing the second trigger, the telematics unit 14 transmits a notification (in the form of a transmission signal) to the mobile device 98 to re-enable the device 98. Non-limiting examples of the second trigger include an ignition-off state of the vehicle 12 or a shift of the transmission system of the vehicle 12 into a park mode. The second trigger may also be the unpairing of the mobile device 98 from the telematics unit 14.

It is to be understood that the re-enabling of the device 98 includes the re-enabling of all of its previously restricted features/sub-features. For example, if the feature that is disabled includes blocking all incoming communications, then re-enabling of the feature includes allowing all incoming communications (e.g., text messages) to be received by the mobile device 98. In this example, all of the blocked messages may be temporarily stored, e.g., at the SMSC until the device 98 is re-enabled. Also in this example, the mobile device 98 and/or the telematics unit 14 sends a data message (e.g., over a packet data channel) to the SMSC notifying the SMSC that the device 98 has been re-enabled. This data message may be sent by the telematics unit 14 to the SMSC upon detecting the second trigger, or by the mobile device 98 to the SMSC in response to the re-enabling of the device 98. In another example, if the feature that has been disabled includes blocking the capability of creating new messages or communications (e.g., by locking the keypad on the device 98), then re-enabling of the feature allows the user to create new messages (e.g., by unlocking the keypad on the device 98). In some cases, the device 98 may further be configured to queue incoming messages while the device 98 is disabled, and then the queued messages are allowed to be received by the device 98 as soon as the device 98 is re-enabled.

Another example of the method of controlling the mobile device 98 involves automatically routing a copy of an incoming text message to a facility other than the mobile communications provider or server, where the text message is converted into a human audible format for audio playback to the user. In an example, the facility may include any facility that is capable of managing text messages for the mobile device 98, however such facility is not the mobile communications provider or server (e.g., VERIZON®, SPRINT®, AT&T®, etc.). Thus, the mobile communications provider is completely transparent to any of the steps associated with the instant example of the method. Examples of the facility include a telematics call or service center (e.g., the call center 24) or a facility that offers voice technology (e.g., NUANCE®, GOOGLE VOICE®, MICROSOFT TELLME®, etc.). For purposes of illustration, the instant example of the method will be described hereinbelow using the call center 24 as the facility other than the mobile communications provider or server.

It is to be understood that the instant example of the method also utilizes an application that is stored in or resident on the mobile device 98. In contrast to the example method described above, the application of the instant example includes a software program that, when activated, instructs the mobile device 98 to automatically copy any incoming text messages, and transmit the copied messages to the call center 24 as soon as the text message(s) is/are received by the device 98. It is to be understood that the automatic transmission of the copied text message(s) to the call center 24 is accomplished without any direct involvement of any vehicle systems that may otherwise be involved in the notification and/or presentation of incoming messages. For instance, the telematics unit 14 is in no way involved in the automatic transmission of a copied text message from the mobile device 98 to the call center 24. In other words, at least the transmission portion of the text messaging management strategy of the instant example is performed by the device 98 alone.

It is to be understood that before the text messaging management strategy application can be activated, i) the application is stored on the mobile device 98, and ii) the mobile device 98 is associated with the telematics unit 14. In an example, the application may be posted on the remotely accessible page 96 by the call center 24 or in an online application store so that the application is available for download by any registered user or subscriber. Downloading may be accomplished, for instance, by selecting a link (which may be presented as a menu option or an icon) on the webpage 96 or application store, which automatically starts the downloading process. In one example, a dialog box may appear that prompts the user to select a location on, e.g., the hardware portion of the processor 100 of the device 98 to which the application is to be stored. Upon making the selection, the downloading process begins, where the selected application file (or folder if the application includes several separate files) is transferred over a wireless connection from the host server 94 to the device 98.

It is to be understood that the application may be downloaded from a webpage (e.g., the previously mentioned application store) operated and/or owned by a facility other than the telematics service provider. In this case, the telematics service provider may have entered into an agreement with the facility to create, sell and/or distribute the application that may be downloaded to the mobile device 98.

The association of the mobile device 98 with the telematics unit 14 (again, which occurs before the text messaging management strategy application can be activated) may be accomplished by registering the telematics unit 14 and the mobile device 98 with the call center 24 using, e.g., the remotely accessible page 96, as previously described. The association may otherwise be accomplished upon pairing the mobile device 98 with the telematics unit 14 for the first time. In this case, as soon as the device 98 is paired with the telematics unit 14 for the first time, the device 98 is considered to be a recognized device. The telematics unit 14 adds the newly paired device 98 to a list of recognized devices (i.e., those devices that have previously been paired with the telematics unit 14), and is therefore aware that the device 98 exists. Likewise, the device 98 adds the newly paired telematics unit 14 to a list of recognized devices, and is therefore aware that the telematics unit 14 exists. Afterwards, the telematics unit 14 (and/or the mobile device 98) automatically looks for the other device whenever the telematics unit 14 (or the mobile device 98) is powered on. Thus, whenever the device 98 is inside the vehicle 12 (or within proximity of the short range wireless connection system 48), the telematics unit 14 detects the presence of the device 98 (or the device 98 detects the presence of the telematics unit 14) and automatically pairs with the device 98 (or the telematics unit 14) upon making the detection.

This example of the application is designed so that it activates itself upon the device 98 pairing with the telematics unit 14. It is to be understood that, once activated, the application resident on the mobile device 98 remains activated until the device 98 is unpaired with the telematics unit 14. Unpairing of the device 98 may be accomplished, e.g., when the device 98 is powered off, is moved to a location that is outside of the short range wireless connection range for suitable pairing (e.g., outside the vehicle 12), or the like.

While in its activated state (i.e., while the device 98 is paired with the telematics unit 14), the application instructs the mobile device 98 to automatically make a copy of any incoming text messages received by the mobile device 98, and to transmit the copied message(s) to the call center 24.

It is to be understood that when the application is activated, all of the functionality of the device 98 still remains operable. For example, when the application is in the activated state, the text message operation mode of the device 98 (i.e., a mode of operation that enables the user to read, respond, and/or create a text message) continues to be operable (i.e., is not disabled). Thus, where a copy of the data file including the text message is routed to the call center 24, the user can still read and respond to the incoming texts on his/her mobile device 98 if he/she so desires.

In an example, the application may also include computer readable code for suppressing a text message notification function of the device 98. For instance, while in an activated state, the application suppresses or turns off an incoming text signal (such as, e.g., a beep, a tone, a vibration, or any other signal that may be used to notify the user of an incoming text message) so that the user is not apprised of any incoming texts at the time the texts are received by the device 98. Although the notification signal is suppressed or turned off, the user may randomly check his/her inbox for new text messages (e.g., by viewing the display screen of the device 98 for an icon or message that the user has unread text messages in his/her inbox) at the user's discretion.

When a copy of a text message is received by the server 70 of the call center 24, the call center 24 equipment stores the copied message in the user profile. The copied message is stored until the message is no longer required for delivery (e.g., the message has already been converted, by the call center 24, into a human audible format and has been relayed to the user, or the mobile device 98 is no longer paired with the telematics unit 14). In an example, the stored message is retrieved from the user profile and converted when the user indicates that he/she wants to listen to the message. The server 70 keeps track of message transactions, but no audio file of the text message is created and/or stored on the server 70.

When the server receives the text message, the communications module 86 at the call center 24 automatically initiates a voice call to the mobile device 98 so as to i) apprise the user that he/she has a new text message, and ii) ask the user whether or not he/she wants to listen to his/her incoming text message. It is to be understood that the voice call initiated by the call center 24 is an automated call. It is further to be understood that the voice call is directed to the mobile device 98, and not to the telematics unit 14. This allows the call center 24 to utilize the user's mobile device 98 airtime (e.g., talking minutes) rather than the airtime (e.g., talking minutes) of the telematics unit 14. However, since the mobile device 98 is paired with the telematics unit 14, the voice call may be received in a hands-free manner inside the vehicle 12 (e.g., may be outputted using the speakers 30, 30' or the vehicle audio system 60, which are both operatively connected to the telematics unit 14) as if the voice call was received by the telematics unit 14 itself.

It is to be understood that the conversion of the text message into an audible human format may be accomplished in real-time. For instance, when a connection is made between the communications module 86 and the mobile device 98, the automated system asks the user if he/she wants to listen to the message. When the user confirms that he/she wants to listen to the message, the message is automatically converted into the human audible format so that the system is ready to play the message back to the user.

Converting of the text message into the audible format may be accomplished, for example, using a text-to-speech conversion program that is executable by the processor 84 at the call center 24. Similar to the text-to-speech unit 41 that is associated with the telematics unit 14, the text-to-speech program run by the processor 84 includes suitable computer readable code that utilizes one or more data translation algorithms to translate or otherwise convert the digital signals of the copied text message (which is in the form of phonetic data) into an audible, human-understandable form. In instances where the text message contains text alone, all of the text is converted and ultimately played back to the user, as described further below. However, in instances where the text message contains graphics (such as, for example, an MMS message), the text portions contained in the message are converted, and the converted text portions are played back to the user. In this example, the graphics portion of the message is not played back to the user.

In an example, the voice call is initiated and the user answers the call using his/her device 98, e.g., by pressing a "Connect" button on the keypad of the mobile device 98, pressing a button present on, e.g., a steering wheel, dashboard, or other location located within the vehicle 12 driver's reach inside the vehicle 12 interior, or the like. A voice connection is established between the call center 24 and the mobile device 98 upon accepting the call. During this voice connection, an automated message is played for the user (e.g., in the vehicle 12 due to the mobile device 98/telematics unit 14 pairing) which apprises the user that he/she has a new text message, e.g., by an automated advisor 62' verbally stating something similar to "Hello! You have a new text message." Then, the automated advisor 62' inquires whether or not the user wants to listen to the message, e.g., by verbally stating something similar to "Say 'yes' or press 1 to listen to your message, or say 'no' or press 2 to decline to listen to your message." If the user elects to listen to the message, he/she may indicate verbally (e.g., by reciting the designated prompt, "yes", into the microphone 28) or physically (e.g., by pressing the "1" button on the phone 98). Upon receiving this indication that the user wants to listen to the message, the call center 24 automatically creates the voice representation of the text message and present the voice representation to the user.

After the message has been presented to the user, the advisor 62' may further ask, for example, whether the user would like to 1) re-listen to the voice message, 2) move onto the next message (if one exists), or 2) delete the message. The user may make his/her selection, for example, by reciting the word associated with the desired command. For instance, the word "Repeat" may be recited to have the message replayed, the phrase "Next Message" may be recited to have another message played, and the word, "Disconnect" may be used to end the call. In another example, the user may make his/her selection by reciting the numerical identifier for the desired option (e.g., the number "1" if the user wants to re-listen to the message, the number "2" if the user wants to move onto the next message, or the number "3" if the user wants to end the call). If the user recites the word "Repeat" or selects option "1", the voice message is automatically played back to the user for at least a second time. The user may then be re-presented with the three options, and the user may make another selection. If the user recites "Next Message" or selects option "2", the next message (if one is available) is played back to the user. If the user recites "Disconnect" or selects option "3", the voice call is disconnected. Further, since the telematics unit 14 is paired with the mobile device 98, the user may make his/her verbal responses or numerical selections, and the call center 24 will respond appropriately.

It is to be understood that all of the copied messages transmitted to the call center 24 from the mobile device 98 are stored in the user profile. These stored messages may have associated therewith its status regarding whether or not the message was listened to by the user. In instances where the audible format of the message is actually played back to the user, the call center 24 will flag the stored text message as having been "read". It is further to be understood that all of the content of the messages stored in the user profile at the call center 24 (whether flagged or not flagged as being read) will automatically be deleted upon disconnecting the mobile device 98 from the telematics unit 14.

Referring back to when the voice call is initiated, in another example, the user does not answer the call using his/her device 98 or verbal prompts. This may be accomplished, for example, by verbally declining the call, by pressing a "Disconnect" button on the device 98, or by letting the device 98 ring until i) the user's voice mailing system picks up or ii) the caller (in this case, the advisor 62' of the call center 24) hangs up. In the latter case, the advisor 62' may be programmed to hang up after a predetermined number of rings (e.g., after 4 rings, after 6 rings, etc.) or after a predetermined amount of time (e.g., after 10 seconds of ring time, after 20 seconds of ring time, etc.). In one example, the advisor 62' may attempt to reinitiate the voice call at a later time (e.g., in 10 minutes, in 20 minutes, etc.). The voice call may be reinitiated any number of times (either randomly or periodically) until the user answers the call or until the mobile device 98 is disconnected from the telematics unit 14. It is to be understood that the call center 24 may reinitiate the voice call even if a connection with the user's device 98 is made, but the user fails to answer the inquiry as to whether or not he/she wants to listen to the voice message. In this case, the advisor 62' may be programmed to re-ask the question one or more times, and if still there is no response, end the voice call.

In instances where the user indicates that he/she declines to listen to the audible form of the text message in response to the inquiry, the advisor 62' automatically ends the voice call. In these instances, the advisor 62' may ask the user if he/she wants to be reminded at a later time, or to delete the message. If the user selects the first option (i.e., to be reminded), the advisor 62' may automatically initiate a follow up voice call at a predetermined amount of time later (e.g., 10 minutes later, 20 minutes later, etc.). In this case, the text message is re-converted into the human audible form when the follow up voice call is made. If the user selects the second option (i.e., to delete the voice message), the advisor 62' will command the processor 84 to automatically delete the content of the text message that is stored in the user's profile, and mark the stored text message as having been deleted (although the message was never actually played back to the user).

As previously mentioned, the application resident on the mobile device 98 remains activated until the device 98 is disconnected from or unpaired with the telematics unit 14. At this point, the application resident on the device 98 is considered to be deactivated. Upon deactivating the application, the mobile device 98 stops transmitting copies of incoming text messages to the call center server 70, and automatically sends a notification to the call center 24 that the device 98 is no longer paired with the telematics unit 14. In response to the notification, the call center 24 cancels any pending voice calls to the mobile device 98, and deletes all of the text messages that are then-currently stored in the user profile. This clean-up process is accomplished by the processor 84 running suitable software programs. It is to be understood that although the copies of the text messages have been deleted from the user profile at the call center 24, the original data files containing the respective text messages are still resident on the device 98 and may be viewed by the user on the device 98 after disconnecting.

While several examples have been described in detail, it will be apparent to those skilled in the art that the disclosed examples may be modified. Therefore, the foregoing description is to be considered non-limiting.

The invention claimed is:

1. A method for controlling a mobile communications device while located in a mobile vehicle, the method comprising:
   pairing the mobile communications device with a telematics unit operatively disposed in the mobile vehicle, the pairing being accomplished using short range wireless communication between the mobile communications device and the telematics unit;
   receiving an incoming text message at the mobile communications device while the mobile communications device is paired with the telematics unit; and
   upon receiving the incoming text message, implementing a text messaging management strategy via any of the telematics unit or the mobile communications device, wherein the text messaging management strategy is executable via an application that is resident on the mobile communications device,
   wherein the implementing of the text messaging management strategy includes:
      via the application, automatically making a copy of the incoming text message;
      transmitting the copy of the incoming text message to a facility other than a mobile communications server;
      via a processor at the facility that is operatively coupled to a computer-readable medium encoded with a software program, converting the copy of the incoming text message into a human audible format for audio playback to an intended recipient of the incoming text message;
      via a communications module operatively associated with the facility, initiating a voice call to the mobile communications device, the voice call including an inquiry as to whether or not the intended recipient of the incoming text message wants to listen to the text message; and
      any of i) transmitting the human audible format of the copy of the incoming text message to the mobile communications device if the intended recipient elects to listen to the text message in response to the inquiry or ii) ending the voice call if the intended recipient declines to listen to the text message in response to the inquiry, wherein the copy of the text message is stored in a user profile at a call center, and wherein the method further comprises flagging the copy of the text message as having been read when the human audible format of the copy of the incoming text message is transmitted to the mobile communications device.

2. The method as defined in claim 1, further comprising:
automatically activating the application resident on the mobile communications device upon pairing of the mobile communications device with the telematics unit; and upon activating the application, maintaining an active state of a text message operation mode of the mobile communications device.

3. A method for controlling a mobile communications device while located in a mobile vehicle, the method comprising:

pairing the mobile communications device with a telematics unit operatively disposed in the mobile vehicle, the pairing being accomplished using short range wireless communication between the mobile communications device and the telematics unit;

receiving an incoming text message at the mobile communications device while the mobile communications device is paired with the telematics unit; and upon receiving the incoming text message, implementing a text messaging management strategy via any of the telematics unit or the mobile communications device, wherein the text messaging management strategy is executable via an application that is resident on the mobile communications device, wherein the implementing of the text messaging management strategy includes:
via the application, automatically making a copy of the incoming text message;
transmitting the copy of the incoming text message to a facility other than a mobile communications server;
via a processor at the facility that is operatively coupled to a computer-readable medium encoded with a software program, converting the copy of the incoming text message into a human audible format for audio playback to an intended recipient of the incoming text message; and
via a communications module operatively associated with the facility, initiating a voice call to the mobile communications device, the voice call including an inquiry as to whether or not the intended recipient of the incoming text message wants to listen to the text message, wherein if the intended recipient does not answer the voice call, the method further comprises:
ending the voice call after a predetermined number of rings or a predetermined amount of time; and
reinitiating the voice call at a later time.

4. A method for controlling a mobile communications device while located in a mobile vehicle, the method comprising:

pairing the mobile communications device with a telematics unit operatively disposed in the mobile vehicle, the pairing being accomplished using short range wireless communication between the mobile communications device and the telematics unit;

receiving an incoming text message at the mobile communications device while the mobile communications device is paired with the telematics unit; and upon receiving the incoming text message, implementing a text messaging management strategy via any of the telematics unit or the mobile communications device, wherein the text messaging management strategy is executable via an application that is resident on the mobile communications device, wherein the implementing of the text messaging management strategy includes:
via the application, automatically making a copy of the incoming text message;
transmitting the copy of the incoming text message to a facility other than a mobile communications server;
via a processor at the facility that is operatively coupled to a computer-readable medium encoded with a software program, converting the copy of the incoming text message into a human audible format for audio playback to an intended recipient of the incoming text message, wherein after the incoming text message is converted into the human audible format, the method further comprises:
disconnecting the mobile communications device from the telematics unit;
upon disconnecting, automatically notifying the facility that the mobile communications device has been disconnected; and
in response to the notification, via the processor at the facility, automatically deleting the copy of the text message.

* * * * *